Sept. 30, 1958      P. P. RONCHES      2,853,994
RADIUS AND TANGENTIAL ANGLE DRESSER
Filed June 10, 1957      2 Sheets-Sheet 1
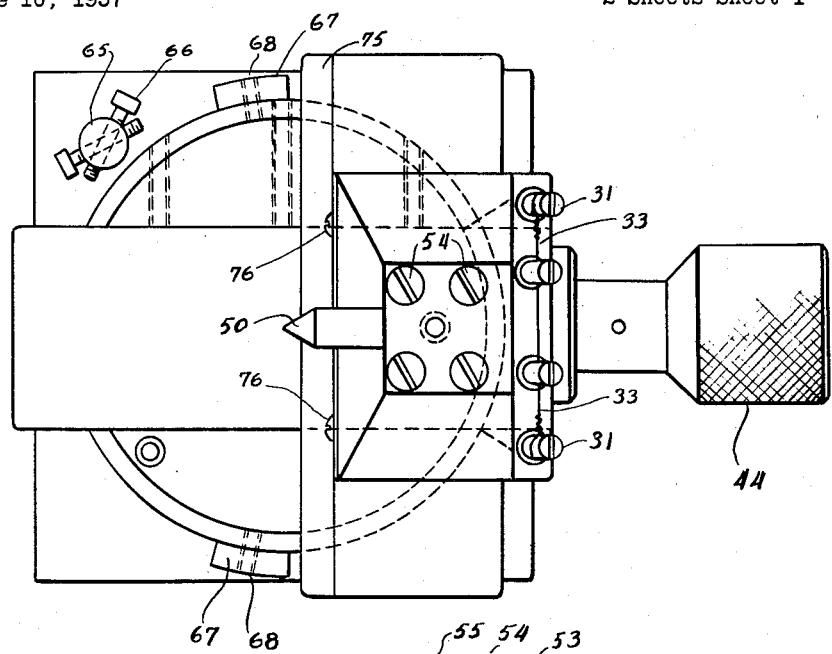
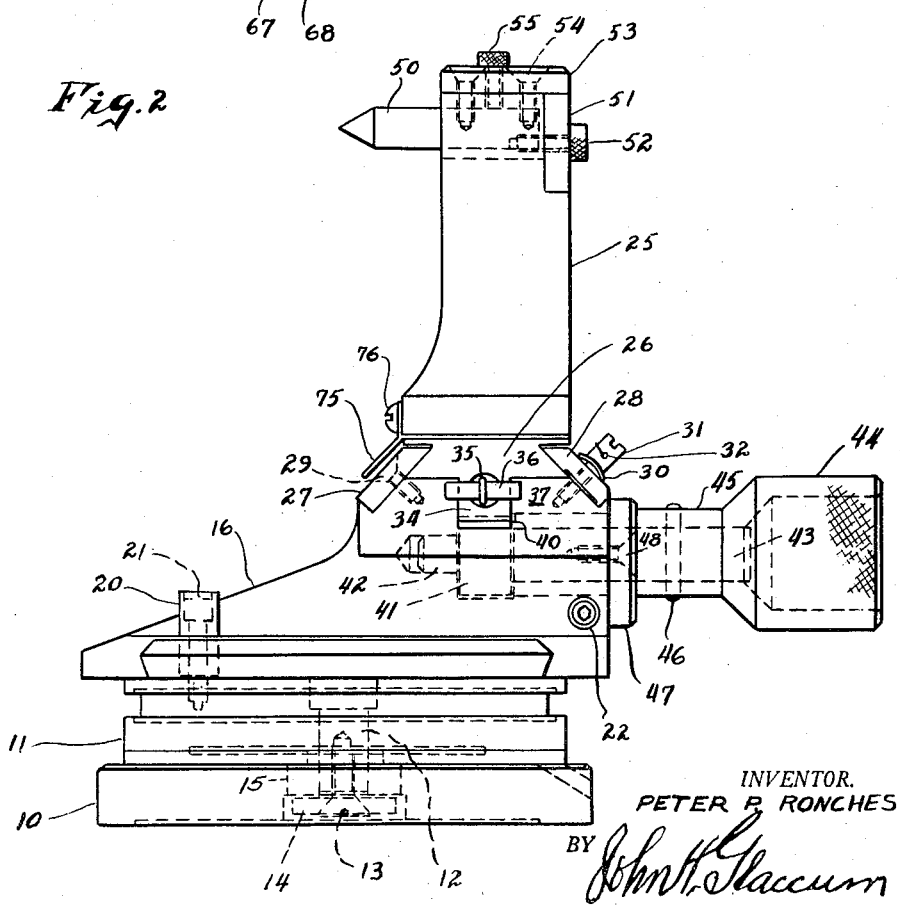
INVENTOR.
PETER P. RONCHES
BY
ATTORNEY Sept. 30, 1958 P. P. RONCHES 2,853,994
RADIUS AND TANGENTIAL ANGLE DRESSER
Filed June 10, 1957 2 Sheets-Sheet 2
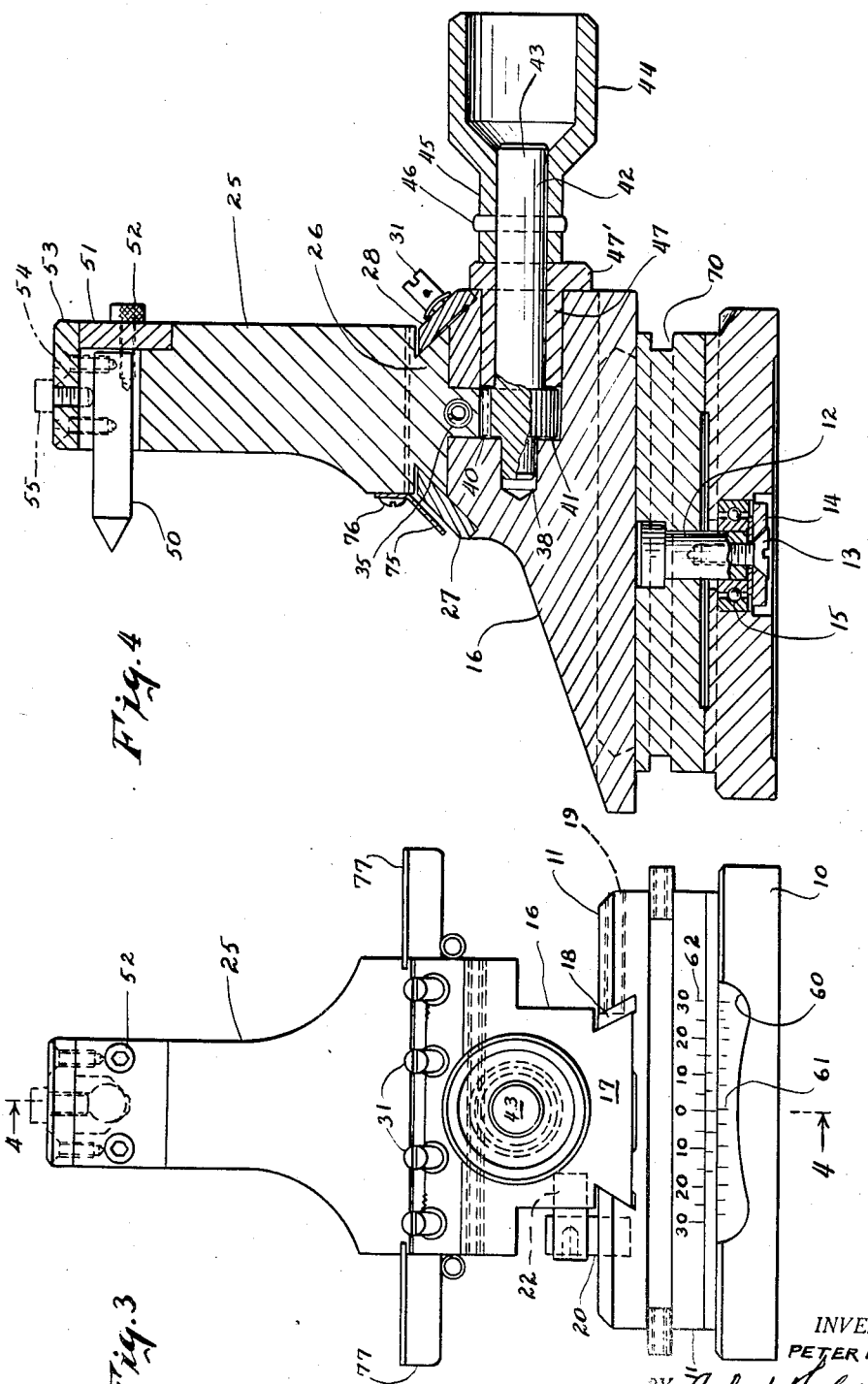
INVENTOR.
PETER P. RONCHES
BY John H. Slaccum
ATTORNEY

United States Patent Office 2,853,994
Patented Sept. 30, 1958

2,853,994

RADIUS AND TANGENTIAL ANGLE DRESSER

Peter P. Ronches, Hillside, N. J., assignor to Form-All Manufacturing Co., East Orange, N. J., a firm Application June 10, 1957, Serial No. 664,561

3 Claims. (Cl. 125—11)

This invention relates to grinding stone dressers and more particularly to a diamond dresser adapted to dress grinding stones at predetermined radii as well as at a geometric angle tangent to the radius.

An object of the invention is to provide a dresser which will grind a stone to either a concave or convex radius and in the same operation dress an angle tangential to that radius if so desired.

A further object is to provide a dresser in which the radius desired may be quickly and easily set by adjustable stops cooperating with a micrometer scale and a vernier for greater accuracy and flexibility.

A still further object is to provide a dresser which is simple to operate and extremely accurate in cutting and which may be readily disassembled for cleaning and for the removal of any abrasive material which might get into moving parts.

A still further object is to provide a dresser in which the tension of the moving parts may be readily adjusted to suit the work to be done and the desires of the operator.

Radii and angle dressers are as a rule rather complicated in their structure, expensive to make and unless very carefully handled may become inaccurate in operation. The present invention involves a dresser which is relatively simple in construction and yet will provide and maintain a degree of accuracy necessary to grind a stone to the radii and to the correct geometric angle.

A still further object of the invention is to provide a compact unit which will have sufficient mass to minimize, if not eliminate, vibration in the dressing process.

Other objects and advantages will become apparent from the accompanying drawings and the description hereof.

In the accompanying drawings—

Fig. 1 is a plan view of a dresser embodying my invention.

Fig. 2 is a side elevation thereof.

Fig. 3 is a rear elevation of such a dresser.

Fig. 4 is a cross-sectional view taken on the line 4—4 of Fig. 3.

Referring more particularly to the drawings, I provide a base 10 which in operation may be placed upon a magnetic chuck to hold it in position with relation to the stone to be cut.

A swivel base 11 is mounted on the base 10 by means of a swivel pin 12 connected to the base 10 by means of a flat head screw 13 extending through a thrust washer 14 and bearing 15 into the swivel pin 12.

Mounted on the swivel base 11 is a carriage 16 which is keyed into the swivel base 11 by means of the dovetail 17, the jib 18 and the cap screw 19 passing through the base 11 and exerting pressure on the jib 18.

A micrometer pin 20 is mounted in the base 11 by means of a screw 21 and a micrometer pin 22 is similarly mounted in the carriage 16. The radii desired may be determined by means of the setting of the carriage 16 in the swivel base 11 relative to the diamond head, as will hereafter be described, the micrometer pins being used as measuring elements to determine the position of the carriage 16 with relation to the swivel base 11.

Mounted on the carriage 16 is the diamond head 25 which is keyed to the carriage 16 by means of the dovetail 26, which is positioned by means of the gibs 27 and 28. The gib 27 is held in place by means of the screws 29 while the gib 28 is tensioned against the dovetail 26 by means of the spring washer 30 and the pre-loaded screws 31. The pre-loaded screws 31 have an opening thereon adapted to receive a locking wire 33 passing through the screwheads to prevent any unintentional change in the tension or any accidental turning thereof.

Passing through the lower portion 34 of the dovetail 26 is a spring 35 positioned by means of the centering pins 36 against the wall 37 of the carriage 16. This spring tends to urge the diamond head 25 to the neutral position and, of course, the freedom of the diamond head 25 depends upon the tension exerted by the gib 28 against the dovetail 26.

On the lower end 34 of the dovetail 26 is a gear rack 40 which engages a pinion 41 mounted on a shaft 42 which is positioned within the opening 38 by means of a combined sleeve and sleeve-plate 47 and 47'. The outer end of the shaft 43 engages a knurled handle 44 having a sleeve 45 which is positioned on the shaft 42 by means of the tapered pin 46. A sleeve plate is attached to the carriage 16 by means of the screw 48. It will be appreciated that when the knurled handle 44 is turned the pinion 41 will operate on the rack 40 to move the diamond head 25 laterally relative to the carriage 16.

Positioned on the diamond head 25 is the cutting diamond 50 which is held in place by the backplate 51 which is positioned on the diamond head by the screws 52 and the top plate 53 positioned by the screws 54. A screw 55 engages the diamond 50 to hold it firmly in place. As shown in the drawings, the diamond 50 and the carriage 16 are positioned in a more or less neutral position to cut a 360° radius on the stone, but it will be appreciated that by increasing the difference between the micrometer pins the radius of the stone to be cut will be shortened and by decreasing the difference between the micrometer pins the radius will be gradually increased until a concave radius is reached.

The base 10 is cut away at 60 to expose a micrometer scale 62 which cooperates with the vernier scale 61 on the base 10 to indicate the setting. A fixed radial stop 65 is provided with adjustable screws 66 for minute adjustment. Adjustable radial stops 67 are mounted in the channel 70 and held in position by means of screws 68. In determining the radial movement of the instrument it is set upon the micrometer reading and the adjustable stops fixed in the proper poistion so that the adjusted stops will engage the permanent stops when the desired arc has been reached.

In order to prevent abrasives from entering the moving mechanism, I provide a dust shield 75 which is affixed to the diamond head 25 by means of screws 76. This dust shield 75 is spaced from and covers the jib 27 to prevent any dust from entering thereon. It is provided with ends 77 which are wider than the diamond head 25 so as to protect the dovetail throughout the lateral movement of the diamond head.

One of the advantages of the invention is the simplicity with which the instrument may be disassembled for cleaning or checking purposes. It will be understood that by releasing the screw 19 the carriage may be readily removed from the swivel base 11 and that by turning the centering pins 36 the spring 35 may be released and by loosening the screws 31 the diamond head may be disengaged from the gear 34 and removed from the carriage.

While a minimum of wear is contemplated any possible wear may be easily corrected by flat grinding the gibs 27 and 28, replacing them and tightening their respective screws.

I claim:

1. A dresser of the class described mounting a cutting diamond, including a base, a swivel base mounted for rotation on said first mentioned base, a fixed stop on said first mentioned base, adjustable stops mounted on said swivel base to engage said fixed stop to limit the rotation of said swivel base, a carriage dovetailed on said swivel base and means to fix said carriage in predetermined positions relative to said swivel base to determine the radii of movement of said cutting diamond, a diamond head dovetailed into said carriage for lateral movement thereon, said diamond head mounting said cutting diamond, means for moving said diamond head laterally, said means including a rack on the bottom of said diamond head, a shaft mounting a gear engaging said rack, a handle on said shaft to rotate said shaft and said gear and to cause said swivel base to rotate within limits of said stops, and means to urge said diamond head to a central position relative to said carriage, said means comprising a spring extending through said diamond head and a pair of pins engaging said spring and bearing against said carriage.

2. A dresser of the class described mounting a cutting diamond, including a base, a swivel base mounted for rotation on said first mentioned base, a fixed stop on said first mentioned base, adjustable stops mounted on said swivel base to engage said fixed stop to limit the rotation of said swivel base, a carriage dovetailed on said swivel base and means to fix said carriage in predetermined positions relative to said swivel base to determine the radii of movement of said cutting diamond, a diamond head dovetailed into said carriage for lateral movement thereon, said diamond head mounting said cutting diamond, means for moving said diamond head laterally, said means including a rack on the bottom of said diamond head, a shaft mounting a gear engaging said rack, a handle on said shaft to rotate said shaft and said gear and to cause said swivel base to rotate within limits of said stops, means to urge said diamond head to a central position relative to said carriage, said means comprising a spring extending through said diamond head, a pair of pins engaging said spring and bearing against said carriage, and means to vary the tension between said diamond head and said carriage, said means comprising a pair of gibs, at least one of said gibs resiliently engaging said carriage and the dovetail of said diamond head, and means to vary the tension between said gibs and the contacting members.

3. A dresser of the class described mounting a cutting diamond, including a base, a swivel base mounted for rotation on said first mentioned base, a fixed stop on said first mentioned base, adjustable stops mounted on said swivel base to engage said fixed stop to limit the rotation of said swivel base, a carriage dovetailed on said swivel base and means to fix said carriage in predetermined positions relative to said swivel base to determine the radii of movement of said cutting diamond, a diamond head dovetailed into said carriage for lateral movement thereon, said diamond head mounting said cutting diamond, means for moving said diamond head laterally, said means including a rack on the bottom of said diamond head, a shaft mounting gear engaging said rack, a handle on said shaft to rotate said shaft and said gear and to cause said swivel base to rotate within limits of said stops, means to urge said diamond head to a central position relative to said carriage, said means comprising a spring extending through said diamond head, a pair of pins engaging said spring and bearing against said carriage, and means to vary the tension between said diamond head and said carriage, said means comprising a pair of gibs, at least one of said gibs resiliently engaging said carriage and the dovetail of said diamond head, means to vary the tension between said gibs and the contacting members, said means consisting of a spring washer engaging said gibs and screw means exerting a selective pressure against said spring washer.

References Cited in the file of this patent

UNITED STATES PATENTS

| 2,345,821 | Kopec | Apr. 4, 1944 |
| 2,366,623 | Jacobsen | Jan. 2, 1945 |
| 2,608,189 | Statia | Aug. 26, 1952 |

FOREIGN PATENTS

| 416,336 | Great Britain | Sept. 11, 1934 |